(12) United States Patent
Vijayan et al.

(10) Patent No.: US 11,227,322 B1
(45) Date of Patent: Jan. 18, 2022

(54) CUSTOMER CATEGORIZATION AND CUSTOMIZED RECOMMENDATIONS FOR AUTOMOTIVE RETAIL

(71) Applicant: TEKION CORP, San Ramon, CA (US)

(72) Inventors: Jayaprakash Vijayan, Dublin, CA (US); Gurusankar Sankararaman, Dublin, CA (US); Jagdish Mohanlal Patel, Fremont, CA (US); Anant Sitaram, San Ramon, CA (US)

(73) Assignee: TEKION CORP, Pleasanton, CA (US)

( * ) Notice: Subject to any disclaimer, the term of this patent is extended or adjusted under 35 U.S.C. 154(b) by 147 days.

(21) Appl. No.: 16/583,928

(22) Filed: Sep. 26, 2019

Related U.S. Application Data

(60) Provisional application No. 62/737,100, filed on Sep. 26, 2018.

(51) Int. Cl.
| | |
|---|---|
| *G06Q 30/00* | (2012.01) |
| *G06Q 30/06* | (2012.01) |
| *G06Q 50/00* | (2012.01) |
| *G06N 20/00* | (2019.01) |

(52) U.S. Cl.
CPC ......... *G06Q 30/0631* (2013.01); *G06N 20/00* (2019.01); *G06Q 30/0611* (2013.01); *G06Q 30/0621* (2013.01); *G06Q 50/01* (2013.01)

(58) Field of Classification Search
CPC ........... G06Q 30/0631; G06Q 30/0611; G06Q 30/0621; G06Q 50/01; G06N 20/00
USPC ....................................................... 705/26.7
See application file for complete search history.

(56) References Cited

U.S. PATENT DOCUMENTS

| | | | | |
|---|---|---|---|---|
| 10,157,411 | B1 * | 12/2018 | Vasishta | G06Q 30/0631 |
| 10,417,650 | B1 * | 9/2019 | Gong | G06Q 30/0202 |
| 2002/0161764 | A1 * | 10/2002 | Sharo | G06Q 30/02 |
| 2003/0088436 | A1 * | 5/2003 | Berger | G06Q 10/20 |
| | | | | 705/304 |
| 2004/0073520 | A1 * | 4/2004 | Eskandari | G06Q 30/02 |
| | | | | 705/400 |

(Continued)

FOREIGN PATENT DOCUMENTS

CA    2985691 A1 * 11/2016    ............. G06Q 30/01

OTHER PUBLICATIONS

Auto Dealer Today Magazine. "Roadster Adds Vehicle Recommendation Feature to Ecommerce System." Jan. 25, 2017. Retrieved from: https://www.autodealertodaymagazine.com/322895/roadster-adds-vehicle-recommendation-feature-to-ecommerce-system (Year: 2017).*

(Continued)

*Primary Examiner* — Abby J Flynn
(74) *Attorney, Agent, or Firm* — Fenwick & West LLP

(57) ABSTRACT

A management system operates in conjunction with an automotive dealership to improve customer engagement with the automotive dealership. The management system creates customer profiles of the automotive dealership systems' customers using features of the customers obtained via various sources. The management system assigns a customer category to a customer based on the features included in the customer profile and may generate a customized recommendation of a product and/or service for the customer to purchase at the dealership based at least in part on the customer category.

22 Claims, 6 Drawing Sheets

(56) References Cited

U.S. PATENT DOCUMENTS

| | | | |
|---|---|---|---|
| 2008/0065476 A1* | 3/2008 | Klein | G06Q 30/02 705/14.13 |
| 2008/0208656 A1* | 8/2008 | Matsubara | G06Q 10/06395 705/7.37 |
| 2008/0250312 A1* | 10/2008 | Curtis | G06Q 10/00 715/700 |
| 2009/0240602 A1* | 9/2009 | Mohr | G06Q 10/00 705/26.1 |
| 2010/0198678 A1* | 8/2010 | Burst | G06Q 30/02 705/14.39 |
| 2013/0117067 A1* | 5/2013 | Sullivan | G06Q 10/06398 705/7.29 |
| 2013/0317886 A1* | 11/2013 | Kiran | G06Q 30/0202 705/7.31 |
| 2014/0122178 A1* | 5/2014 | Knight | G06Q 30/0202 705/7.31 |
| 2014/0279263 A1* | 9/2014 | Liu | G06Q 30/0627 705/26.63 |
| 2016/0189210 A1* | 6/2016 | Lacey | G06N 7/005 705/7.31 |
| 2016/0253706 A1* | 9/2016 | Kursar | H04W 4/44 705/14.58 |
| 2016/0275590 A1* | 9/2016 | Todasco | G06Q 30/016 |
| 2016/0292600 A1* | 10/2016 | Alex | G06N 7/08 |
| 2017/0109944 A1* | 4/2017 | Barajas Gonzalez | G07C 5/02 |
| 2017/0337573 A1* | 11/2017 | Toprak | G07C 5/006 |
| 2018/0075351 A1* | 3/2018 | Iwakura | G06K 9/6268 |
| 2018/0108058 A1* | 4/2018 | Cotton | G06Q 30/01 |
| 2019/0122251 A1* | 4/2019 | Hoffman | G06Q 30/0242 |
| 2019/0130015 A1* | 5/2019 | Zhang | G06N 7/005 |
| 2019/0180358 A1* | 6/2019 | Nandan | G06K 9/6269 |

OTHER PUBLICATIONS

Khajvand, Mahboubeh, et al. "Estimating customer lifetime value based on RFM analysis of customer purchase behavior: Case study." Procedia Computer Science 3 (2011): 57-63. (Year: 2011).*

* cited by examiner

CUSTOMER CATEGORIZATION AND CUSTOMIZED RECOMMENDATIONS FOR AUTOMOTIVE RETAIL

CROSS REFERENCE TO RELATED APPLICATION

This application claims the benefit of U.S. Provisional Application No. 62/737,100 filed on Sep. 26, 2018, which is hereby incorporated by reference in its entirety.

BACKGROUND

Field of Disclosure

The present disclosure generally relates to customer profiling systems, and more specifically to ways to categorize customers of automotive dealerships in a manner that improves engagement of the automotive dealerships and automotive manufacturers with their customers using customized recommendations of products and/or services based on the categorizations.

Description of the Related Art

Historically, automobile dealerships have relied on receiving their business based solely on their geographic location given that customers typically prefer to conduct business with an automobile dealership that is local to the customers. Automobile dealerships in the past have utilized generic marketing to try to gain further business from their local customers. However, due to varying demographic differences between the customers, conventional marketing techniques employed by conventional automotive dealerships fail to engage with their customers in a manner that will more likely result in further business with the customers.

SUMMARY

In one embodiment a management system operates in conjunction with one or more automotive dealership systems to improve customer engagement with the automotive dealership systems. The management system creates customer profiles of the automotive dealership systems' customers using features of the customers obtained via various sources. In one embodiment, a customer profile may include an array of features that describe the customer such as demographic information, driving information related to the customer, spending information of the customer at the dealership system, website browsing information, social information related to the customer, etc.

In one embodiment, the management system assigns a customer category to a customer based on the features included in the customer profile. The assigned customer category is selected from a plurality of different customer categories where each customer category is indicative of a level of importance of the customer to the automotive dealership system. Based on the customer category assigned to a customer in combination with other factors such as those specified in the customer profile and any dealership or automotive manufacture incentives, the management system may perform various functions such as identifying customers most likely to purchase specific products and services and create customized recommendations for these products and services to be marketed to the customer by the automotive dealership systems, enables the automotive dealership systems to create customized marketing campaigns for a specific customer using the customer's preferred type of media, enables automotive manufacturers to align incentives, discounts, and marketing dollars to customers on an individualized basis based on the assigned category, and enables automotive manufacturers and dealerships to produce and stock inventory based on the customized recommendations generated by the management system.

The above and other needs are met by a computer-implemented method, a non-transitory computer-readable storage medium storing executable code, and a system for providing customized recommendations of products and services for customers of an automobile dealership.

One embodiment of the computer-implemented method of a management system for providing customized recommendations of products and services for customers of an automobile dealership comprises: storing a customer profile of a customer of the automobile dealership, the customer profile describing features of the customer including the customer's spending information at the automobile dealership; assigning a customer category from a plurality of customer categories to the customer based on the customer's spending information, the assigned customer category indicative of a level of importance of the customer to the automobile dealership; and providing the assigned customer category to the automobile dealership; wherein a customized recommendation of at least one of a product or service for the customer to purchase from the automobile dealership is provided to the customer while the customer is at the automobile dealership, the customized recommendation of the product based on the assigned customer category.

One embodiment of a non-transitory computer-readable storage medium storing executable computer program instructions for comprises instructions for providing customized recommendations of products and services for customers of an automobile dealership, the instructions when executed by one or more computer processors cause the one or more computer processors to perform steps comprising: storing a customer profile of a customer of the automobile dealership, the customer profile describing features of the customer including the customer's spending information at the automobile dealership; assigning a customer category from a plurality of customer categories to the customer based on the customer's spending information, the assigned customer category indicative of a level of importance of the customer to the automobile dealership; and providing the assigned customer category to the automobile dealership; wherein a customized recommendation of at least one of a product or service for the customer to purchase from the automobile dealership is provided to the customer while the customer is at the automobile dealership, the customized recommendation of the product based on the assigned customer category.

One embodiment of a system for providing customized recommendations of products and services for customers of an automobile dealership, comprises one or more computer processors; and a non-transitory computer-readable storage medium storing executable computer program instructions, the instructions when executed by the one or more computer processors cause the one or more computer processors to perform steps comprising: storing a customer profile of a customer of the automobile dealership, the customer profile describing features of the customer including the customer's spending information at the automobile dealership; assigning a customer category from a plurality of customer categories to the customer based on the customer's spending information, the assigned customer category indicative of a level of importance of the customer to the automobile dealership; providing the assigned customer category to the automobile dealership wherein a customized recommendation of at least one of a product or service for the customer to purchase from the automobile dealership is provided to the customer while the customer is at the automobile dealership, the customized recommendation of the product based on the assigned customer category.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
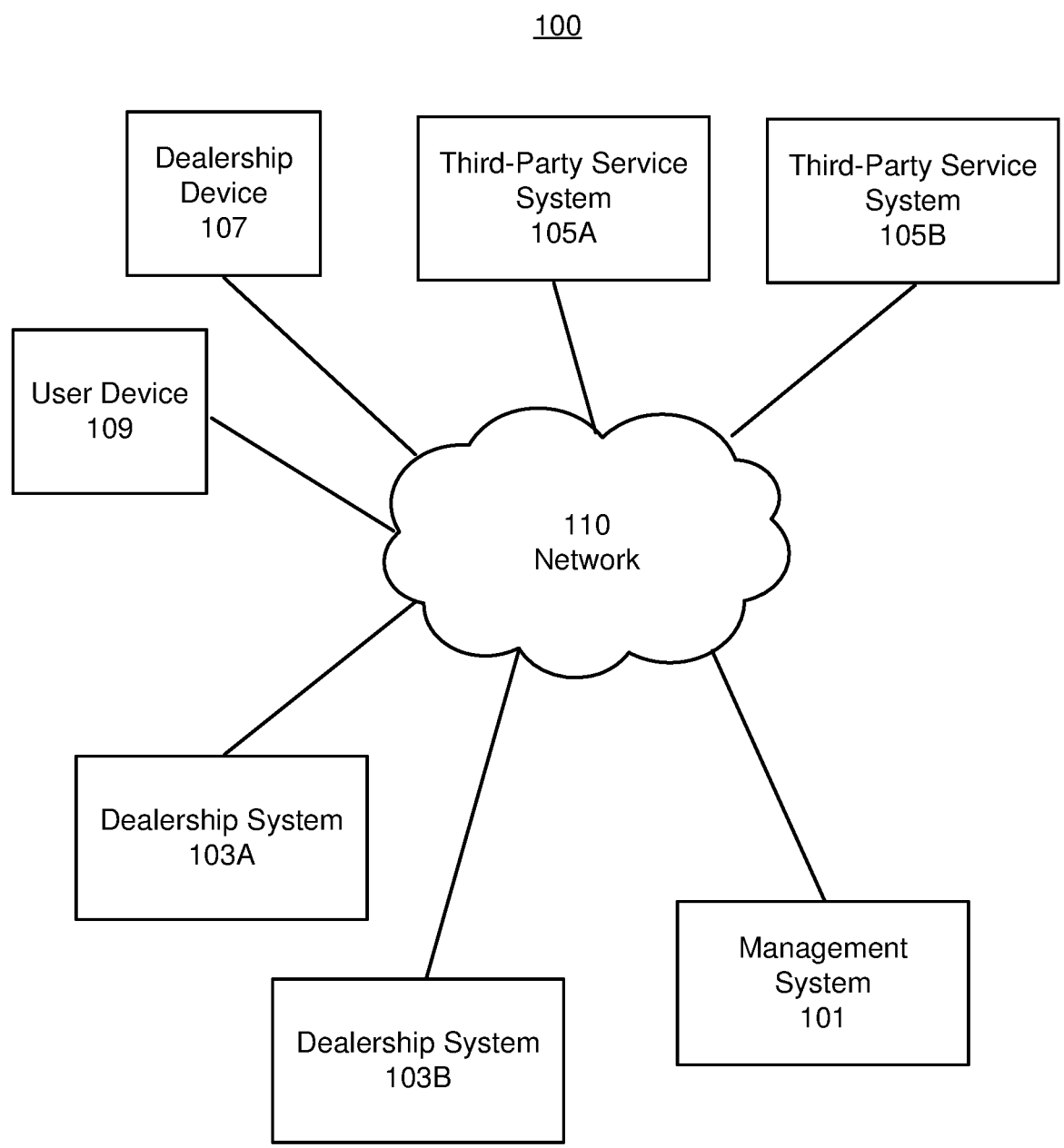
FIG. 1 is a high-level block diagram illustrating an embodiment of an environment for providing customized recommendations of products and/or services to automobile dealership customers according to one embodiment.

FIG. 1 is a high-level block diagram illustrating an embodiment of an environment 100 for providing customized recommendations of products (e.g., automobiles, parts, accessories, etc.) or services to customers of automobile dealerships. While the embodiments herein are described with respect to the context of automobile dealerships, the techniques described herein are applicable to any context where customers may receive customized recommendations of products or services.

In one embodiment, the environment 100 includes a management system 101, a dealership system 103A, a dealership system 103B, a third-party service system 105A, a third-party service system 105B, a dealership device 107, and a customer device 109 connected to each other via a network 110. While only two instances of dealership systems 103, two instances of third-party services systems 105, and a single instance of each of the dealership device 107 and user device 109 are shown, there may be multiple instances of each of these different entities.

The network 110 provides a communication infrastructure between the entities included in environment 100. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

In one embodiment, a dealership system 103 is representative of an automobile dealership that sells automobiles (new or used) at the retail level based on a dealership contract with an automotive manufacturer (e.g., GM, FORD, TOYOTA, BMW, etc.). The dealership system 103 may also perform services on automobiles owned by customers of the dealership system 103. The services may include basic maintenance such as an engine oil change, brake pad replacement, brake rotor replacement, brake fluid replacement, transmission oil change, etc. as well as more complex services such as engine rebuild services or suspension overhaul services. However, the services that may be performed by the dealership system 103 are not limited to those described herein.

The dealership system 103 also may sell other products to its customers than automobiles. For example, the automobile system 103 may also sell original equipment manufacturer (OEM) parts for automobiles sold by the dealership system 103 as well as automobile related accessories. Examples of the automobile related accessories include hats, license plate frames, floor mats, key chains, wiper blades, etc.

As shown in FIG. 1, the environment 100 includes dealership system 103A and dealership system 103B. Each dealership system 103 is representative of a different automobile dealership. The different dealership systems 103 shown in FIG. 1 may represent automobile dealerships selling different makes of automobiles. For example, dealership system 103A may represent a particular instance of a GM dealership whereas dealership system 103B may represent a particular instance of a TOYOTA dealership. In another embodiment, the different dealership systems 103 shown in FIG. 1 may represent two different automobile dealerships selling the same make of automobiles. For example, dealership system 103A and 103B are different automobile dealerships that both sell GM automobiles.

In one embodiment, the management system 101 manages customer information of customers of the dealership system 103 in a manner that allows for the management system 101 to generate customized recommendations of products and/or services for the customers of the dealership system 103. Generally, the management system 101 generates customer profiles for customers of the dealership system 103 and categorizes (e.g., segments) customers of the dealership system 103 into one of a plurality of predefined customer categories according to different customer features included in the customer profiles.

Based on the categorization of the customers, the management system 101 can identify customers more likely to purchase specific products and services from the dealership system 103 and generates customized recommends the products and/or services for the customers of the dealership system 103. The categorization of the customers also allows for the dealership system 103 to create targeted marking campaigns for a specific customer as well as enable OEMs to align incentives, discounts, and marketing dollars to customers in an individualized basis. In yet another embodiment, the categorization of the customers allows for the dealership system 103 to stock inventory that customers are likely to purchase while at the dealership system 103. Thus, the management system 101 provides the dealership system 103 with information that allows for increased engagement with dealership customers (e.g., increased sales) as well as more efficient allocation of dealership resources, as will be further described with respect to FIG. 2.

As mentioned above, the management system 101 generates customer profiles for customers of the dealership system 103. In one embodiment, features for customer profiles may be received from a third-party service system 105. A third-party service system 105 is a separate entity from the management system 101 and the dealership system 103.

An example of a third-party service system 105 is a social networking system such as FACEBOOK, TWITTER, etc. A social networking system comprises one or more computing devices storing a social network, or a social graph, comprising a plurality of users and providing users of the social network with the ability to communicate and interact with other users of the social network. The social networking system provides users of the social networking system with the ability to take actions on various types of items, or objects, supported by the social networking system. A user of the social network can add, upload, send, or "post," to the social networking system. For example, a user communicates posts to the social networking system from a user device 109. Posts may include data such as status updates or other textual data, location information, photos, videos, links, music or other similar data and/or media.

The social networking system also stores user profiles describing the users of the social networking system. The user profiles include biographic, demographic, and other types of descriptive information, such as work experience, educational history, hobbies or preferences, interests, location, and the like. Due to the social networking system having an array of different information of the dealership system 103's customers, the management system 101 may request information about the dealership system 103's customers from the social networking system once the customers have granted the management system 101 access to their account on the social networking system. For example, customers of the dealership system 103 may agree to receiving customized recommendations of products and/or services offered by the dealership system 103 and the agreement may include the customers agreeing to provide to the management system 101 and/or the dealership system 103 login information to their social networking account(s).

Another example of a third-party service system 105 is a vehicle data company such as CHROMEDATA. In one embodiment, a vehicle data company stores data related to automobiles such as last known mileage and accident history related to each vehicle. Due to the dealership system 103 selling automobiles to the customers and/or servicing the customer's automobiles, the management system 101 has access to the vehicle identification number (VIN) of customers' automobiles and may provide the VIN of the customers' automobiles to the vehicle data company. In response to submitting a VIN of a customer's automobile, the management system 101 may receive from the vehicle data company the mileage and accident history associated with the VIN that may be used to create the customer profile where the accident history describes any accidents involving the automobile associated with the VIN.

In another example, a third-party service system 105 is a weather forecast system such as the Global Forecast System (GFS). The management system 100 may obtain weather forecast information from the weather forecast system to provide service or accessory recommendations based on the weather forecast.

Although the description herein describes examples of the third-party service system 105 as being a social networking system, a vehicle data company, and a weather forecast system, the third-party service system 105 can be any type of entity that can provide information about customers of the dealership system 103 that can be used to create a customer profile or any type of entity that can provide information that can be used for creating customized recommendations of products and/or services for customers of the dealership system 103.

In one embodiment, a dealership device 107 and the user device 109 are computing devices such as smartphones with an operating system such as ANDROID® or APPLE® IOS®, tablet computers, laptop computers, desktop computers, or display monitors. Typical dealership devices 107 and user devices 109 include the hardware and software needed to input and output sound (e.g., speakers and microphone) and images, connect to the network 110 (e.g., via Wifi and/or 5G or other wireless telecommunication standards), determine the current geographic location of the dealership devices 107 and user devices 109 (e.g., a Global Positioning System (GPS) unit), and/or detect motion of the dealership devices 107 and user devices 109 (e.g., via motion sensors such as accelerometers and gyroscopes).

In one embodiment, a user device 109 is the personal device of a customer of the dealership system 103. In contrast, a dealership device 107 is a device owned by the dealership system 103 and is typically located at the dealership system 103. The dealership device 107 may be used by an employee of the dealership system 103 during a customer intake process at the dealership system 103.

For example, an employee of the dealership system 103 may use the dealership device 107 to check-in a customer when the customer arrives at the dealership system 103 for service of an automobile. The check-in process for servicing the automobile may involve the employee receiving information about the customer (e.g., name, phone number, contact information), information about the vehicle (e.g., VIN, license plate, mileage, year, make, and model), as well as the requested service.

In another example, the employee of the dealership system 103 may use the dealership device 107 to check-in a customer when the customer arrives at the dealership system 103 to purchase a new car. The check-in process for purchasing a new car may include receiving information about the customer (e.g., name, phone number, contact information) as well as information about the vehicle of interest for purchase (e.g., year, make, model, spending range, etc.).

In one embodiment, both the dealership device 107 and user device 109 may include an application that allows interaction with the management system 101 and/or dealership system 103. The application may be a dedicated application specifically designed (e.g., by the organization responsible for the management system 101) to enable interactions with the management system 101. As will be described in further detail below, the application may present product, service, and/or accessory recommendations to the customer via the dealership device 107 and/or the user device 109 that is customized for the customer.

Management System

Figure 2:
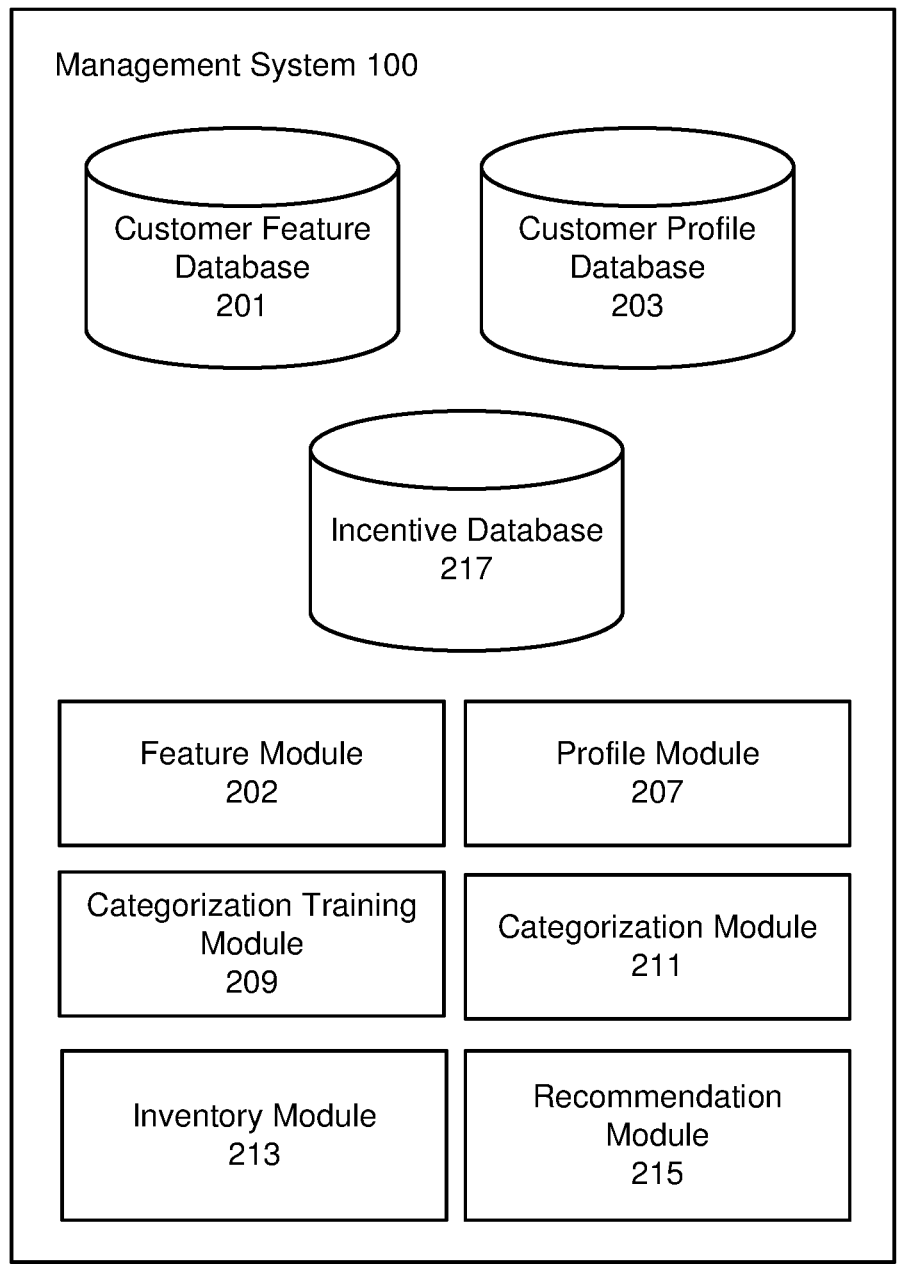
FIG. 2 is a high-level block diagram illustrating a detailed view of a management system of FIG. 1, according to one embodiment.

FIG. 2 is a high-level block diagram illustrating a detailed view of a management system 100 of FIG. 1, according to one embodiment. In one embodiment, the management system 100 includes a customer feature database 201, a customer profile database 203, an incentive database 217, a feature module 202, a profile module 207, a categorization training module 209, a categorization module 211, an inventory module 213, and a recommendation module 215. Note that in other embodiments, the management system 100 may include other modules and/or databases than those illustrated in FIG. 2.

Customer Profiles

In one embodiment, the feature module 202 retrieves features of customers of the dealership system 103 in order for the management system 100 to create customer profiles for the customers. The feature module 202 may store the retrieved features of customers of the dealership system 103 in the customer feature database 201.

In one embodiment, the feature module 202 may retrieve the features of the dealership system 103's customers from the dealership system 103. An example category of features retrieved by the feature module 202 is demographic information of customers of the dealership system 103. As part of the automobile purchasing process completed by the dealership system 103, the dealership system 103 collects demographic information from its customers. The demographic information may be collected in a loan application or in a questionnaire completed by the customer during the purchasing process, for example. In one embodiment, the demographic information includes at least one of income (e.g., yearly salary), age, residence information (e.g., home address), gender, family size, education level, or marital status.

Another example category of features retrieved by the feature module 202 is spending information of customers of the dealership system 103. The spending information is a history of transactions related to automobiles purchased at the dealership system 103, services purchased at the dealership system 103, parts purchased at the dealership system 103, and/or accessories purchased at the dealership system 103. The spending information may include the date of each purchase and total amount spent during each transaction.

Another example category of features retrieved by the feature module 202 from the dealership system 103 is browsing information. The browsing information of a customer may describe the customer's browsing habits on a website provided by the dealership system 103 or a website by the automotive manufacturer associated with the dealership system 103. The browsing habits include the specific web pages interacted with by the customer on the websites, for example.

In one embodiment, the feature module 202 may have direct access to the demographic information, the spending information, and the browsing information of the dealership system 103's customers. That is, the feature module 202 may directly access a customer profile database 303 in the dealership system 103 that stores the demographic information and browsing information of the dealership system 103's customers as well as direct access to a sales database 301 in the dealership system 103 that stores sales information. Thus, the feature module 202 may retrieve the demographic information, browsing information, and spending information of one or more of the dealership system 103's customers directly from the dealership system 103. Alternatively, the feature module 202 may submit a request to the dealership system 103 for demographic information, browsing information, and spending information of one or more of the dealership system 103's customers and receive the requested information responsive to the request.

Another example category of features retrieved by the feature module 202 is driving information of customers of the dealership system 103. In one embodiment, driving information includes the last known mileage of an automobile owned by a customer of the dealership system 103 and an accident history of the automobile. The accident history at the minimum may describe the number of accidents that the automobile was involved in. The accident history may also describe other information such as the mileage of the automobile at the time of each accident as well as any descriptive information about the accident (e.g., total loss, bumper damage, etc.)

In one embodiment, the feature module 202 retrieves driving information of the dealership system 103's customers from a third-party service system 105 such as a vehicle data company. The feature module 202 may have access to the VIN of automobiles owned and/or leased by customers of the dealership system 103 through the dealership system 103 and may provide the VIN to the third-party service system 105. In return, the feature module 202 may receive from the third-party service system 105 the driving information (e.g., mileage and accident history) associated with the VIN.

Another example category of features retrieved by the feature module 202 is social information related to the dealership system 103's customers. The social information may describe any social aspect related to the dealership system 103's customers including significant events in the social lives of the customers. Examples of the special events could be birthdays, anniversaries, vacations, birth of children, retirement, work promotions, graduations, etc.

In one embodiment, the feature module 202 retrieves social information of the dealership system 103's customers from a third-party service system 105 such as one or more different social networking systems. If the management system 101 has been granted access to a customer's account on the social networking system, the feature module 202 may request the social information from the social networking system and receive the requested social information responsive to the request.

In one embodiment, the profile module 207 generates customer profiles for customers of the dealership system 103. For each customer of the dealership system 103, the profile module 207 may retrieve the feature information of the customer stored in the customer feature database 201 and generate a customer profile that includes the feature information. In one embodiment, the profile module 207 stores a customer profile for a customer in the customer profile database 203 using a data structure with fields suitable for describing the features for the customer profile.

For example, the customer profile may include a field describing the feature category (e.g., demographic, driving information, spending information, social information, etc.), the feature type within the feature category (e.g., age for demographic information, mileage for driving information, etc.), a value for the feature type (e.g., 35 years old for age or 20,000 miles for mileage), and a source of the feature information (e.g., from the dealership system 103 or the particular third-party service system that provided the feature information). The profile module 207 may populate the fields of the customer profile with information stored in the customer feature database 201.

In one embodiment, the profile module 207 may also populate a customer profile with the customer's preferences of the type of media that the customer is most receptive to receiving from the management system 100 and/or the dealership system 103. For example, the customer profile may indicate whether the customer prefers to receive print media, digital media, social media, email, or a telephone call. In one embodiment, customer preferences may be received from the dealer system 105 that obtained the preferences at the time when the customer made a purchase(s) at the dealer system 105. Alternatively, the customer preferences 207 may be determined by the management system 100 based on the customer's positive or negative engagements with different types of media provided to the customer. That is, the management system 100 may track customer engagement with different types of media to identify customer preferences.

In one embodiment, each customer profile stored in the customer profile database 203 also includes a customer category assigned to the customer of the dealership system 103. The customer category assigned to the customer describes a level of importance of the customer to the dealership system 103 and impacts the discounts, incentives, and/or marketing that is applicable to the customer as will be further described below. In one embodiment, a customer may be categorized into one of the following customer categories: champion customer, loyal customer, potential loyal customer, recent customer, promising customer, customer needing attention, customer about to sleep, at risk customer, a prior champion customer, and a lost customer.

In one embodiment, a champion customer is a customer of the dealership system 103 that has made purchases of automobiles, services, parts, and/or accessories at the dealership system 103 recently, with high frequency over a threshold period of time, and has spent over a threshold amount of money with the dealership system 103. Champion customers typically do not require any promotions or incentives to purchase automobiles at the dealership system 103. For example, a champion customer may be a customer that has bought an automobile from the dealership system 103 in the past month and typically purchases a new automobile every 3-months for the past 5 years, and has spent over $300,000 at the dealership system 103.

In one embodiment, a loyal customer is a customer of the dealership system 103 that has made purchases at the dealership system 103 with high frequency and has spent over a threshold amount of money, but at a frequency and amount that is less than that of a champion customer. Furthermore, a loyal customer is typically responsive to promotions that lead to the customer making a purchase whereas a champion customer does not require a promotion to incentivize the champion customer's purchase.

In one embodiment, a potential loyal customer is a recent customer of the dealership system 103 that has made multiple purchases at the dealership system 103 and spent over a threshold amount of money at the dealership system 103. A customer may be considered "recent" if the customer made the first purchase at the dealership system 103 within the past year in one embodiment.

In one embodiment, a recent customer of the dealership system 103 is a customer that has made a purchase at the dealership system 103 recently (e.g., within the past year) and spent a threshold amount of money at the dealership system 103, but with low frequency since the time when the customer first made a purchase at the dealership system 103.

In one embodiment, a promising customer of the dealership system 103 is a customer that has recently made a purchase at the dealership system 103 (e.g., within the past year) and spent less than a threshold amount of money at the dealership system 103.

In one embodiment, a customer needing attention is a customer of the dealership system 103 that has spent an average amount of money at the dealership system 103 that is above a threshold at an average frequency above a threshold, but has not made a purchase at the dealership system 103 recently (e.g., within the past year).

In one embodiment, a customer "about to sleep" is a customer of the dealership system 103 that has spent on average an amount of money at the dealership system 103 that is below a threshold, at an average frequency that is below a threshold, with an average recency that is below a threshold. A customer that is about to sleep needs to be contacted or may not complete any purchases at the dealership system 103 in the future.

In one embodiment, an "at risk" customer is a customer of the dealership system 103 that has spent a total amount of money over a threshold with a frequency over a threshold, but made the last purchase at the dealership system 103 over a threshold amount of time (e.g., 3 years ago). A customer that is "at risk" needs to be contacted or may not complete any purchases at the dealership system 103 in the future.

In one embodiment, a prior champion customer is a customer of the dealership system 103 that has previously made purchases at the frequency and amount spent of a champion customer, but has not made a purchase within a threshold amount of time (e.g., 3 years). A prior champion needs to be contacted or may not complete any purchases at the dealership system 103 in the future.

Lastly, a "lost" customer is a customer of the dealership system 103 that had spent a total amount of money at the dealership system 103 below a threshold, at a recency that is below a threshold, and at a frequency that is below a threshold. Thus, it is unlikely that the "lost" customer will make a future purchase at the dealership system 103.

Customer Categorization

In one embodiment, the management system 100 includes a categorization training module 209. The categorization training module 209 trains the categorization module 211 to automatically categorize customers of the dealership system 103 into one of the plurality of customer categories described above.

The categorization training module 209 trains the categorization module 211 based on training customer profiles stored in the customer profile database 203. In one embodiment, the customer profile database 203 may include for each customer category described above a threshold number of customer profiles (e.g., 100 customer profiles) that are manually assigned the customer category by an employee of the management system 100. For example, the customer profile database 203 may include one hundred customer profiles assigned the classification as a "champion customer," one hundred customer profiles assigned the classification as a "loyal customer," and so on.

In one embodiment, the categorization training module 209 extracts features from the training customer profiles that are used to train the categorization module 211. The features extracted by the categorization training module 209 serve as descriptive quantitative representations of the training profiles for use in training the categorization module 211. For each customer category, categorization training module 209 extracts from each training profile assigned to the customer category the following monetary associated features:

A total amount of money spent at the dealership system 103;

A frequency of purchases made at the dealership system 103; and

A recency of a last purchase made at the dealership system 103.

The combination of the various features extracted from the training profiles serve as feature vectors that characterize the training profiles for the customer category and may be extracted from the spending information included in training profiles.

In one embodiment, the categorization module 211 is a machine-learned Recency, Frequency, and Monetary analysis (RFMA) model with classification and clustering. To train the categorization module 211, the categorization training module 209 applies the features vectors that character the training profiles associated with each customer category to the categorization module 211 as an input to the categorization module 211. The categorization training module 209 trains the categorization module 211 to learn a set of weights on features of the training profiles for each of the customer categories so that the categorization module 211 can assign a category to each customer of the dealership system 103.

Once the initial training of the categorization module 211 is complete, the categorization training module 209 may re-apply the training profiles to the trained categorization module 11 (e.g., to the machine-learned RFMA model) to test the accuracy of the trained categorization module 211. Responsive to receiving a training profile, the categorization module 211 outputs an assigned customer category of the customer associated with the training profile. Given that each training profile has already been pre-categorized by an employee of the management system 100, the categorization training module 209 can compare the customer category output by the categorization module 211 to the category assigned to the training profile. The categorization training module 209 determines whether the categorization module 211 accurately predicted the customer category of the training profile based on the comparison.

The categorization training module 209 may update the categorization module 211 (e.g., the machine-learned RFMA model) if the categorization training module 209 determines that the categorization module 211 did not accurately categorize the training profiles with a threshold accuracy (e.g., 90% accurate). The categorization training module 209 may update the categorization module 211 by adjusting the weights of the features of the training profiles in the machine-learned RFMA model. The categorization training module 209 may iteratively update the categorization module 211 until the categorization module 211 can assign the customer category to the training profiles with the threshold accuracy (e.g., 90% accuracy). Once the categorization training module 209 has trained the categorization module 211 to have the threshold accuracy, the categorization module 211 is considered trained.

In one embodiment, the categorization training module 209 may periodically retrain the categorization module 211 (e.g., the machine-learned RFMA model) using more recent customer profiles that were categorized by an employee of the management system 100. By periodically retraining the categorization module 211, the categorization training module 209 can improve the categorization capabilities of the categorization module 211. In one embodiment, the categorization training module 209 retrains the categorization module 211 after a threshold amount of time has elapsed since the last training. For example, the categorization training module 209 retrains the categorization module 211 every 60 days. Alternatively, the categorization training module 209 retrains the categorization module 211 after a threshold amount of new customer profiles are stored in the customer profile database 203 (e.g., one thousand new customer profiles).

Once the categorization module 211 is trained, the categorization module 211 can assign a customer category to each of the dealership system 103's customers having a customer profile in the customer profile database 203. In one embodiment, after a customer profile of a customer of the dealership system 103 is created in the customer profile database 203, the customer profile is applied to the categorization module 211. Responsive to receiving the customer profile, the categorization module 211 can assign one of the customer categories to the customer and the customer profile is updated to indicate the assigned category.

Note that the level of monetary features that characterizes each of the different customer categories described above varies from dealership system 103 to dealership system 103. For example, the level of the monetary features that would qualify a customer to be a "champion customer" at dealership system 103A may only qualify another customer of dealership system 103B as a "promising customer." This is due to each dealership system 103 having different levels of business (e.g., sales) due to varying factors such as geographic location and make of automobiles sold by the dealership system 103. For example, a dealership system 103 located in a metropolitan city may sell more automobiles, parts, and services to customers in a given month compared to another dealership system 103 located in a rural town. In another example, a dealership system 103 that sells mass produced vehicles (e.g., TOYOTA) may sell more automobiles, parts and services to customers compared to a dealership system 103 that sells niche vehicles (e.g., FERRARI). Thus, in one embodiment there may be various instances of the categorization module 211 where each categorization module 211 is trained by the categorization training module 209 to assign customer categories to customers of a particular dealership system 103 that is associated with the categorization module 211.

Customized Recommendations

In one embodiment, the inventory module 212 communicates with the dealership system 213 to obtain inventory information from the dealership system 103. The inventory information describes the current automobile inventory at the dealership system 103. The inventory information may also include inventory of parts and/or accessories at the dealership system 103. In one embodiment, the management system 100 may consider current inventory of the dealership system 103 when creating customized recommendations of products as further described below.

In one embodiment, the recommendation module 215 generates customized recommendations of products (e.g., automobiles, parts, accessories, etc.) and/or services for customers of the dealership system 103. The customized recommendations may be transmitted to the dealership system 103, so that the dealership system 103 can provide the customized recommendations to the dealership system 103's customers in real-time while the customers are at the dealership system 103. It is beneficial to provide the customized recommendations to customers in real-time as customers are more inclined to purchase products and/or services while already at the dealership.

For example, the recommendation module 215 may generate a customized recommendation that is provided to the dealership system 103 to provide to a customer when the customer is at the dealership system 103. In one embodiment, a service advisor at the dealership system 103 may provide the customized recommendation to the customer using the dealership device 107 when the customer arrives at the dealership system 103 to service his or her automobile at the dealership system 103. In another example, a sales associate may provide the customized recommendation to the customer using the dealership device 107 when the customer arrives at the dealership system 103 to browse the dealership system 103's current automobile inventory.

In another embodiment, the recommendation module 217 may provide customized recommendations to the user devices 109 of customers rather than have the dealership system 103 provide the customized recommendations to the customers while the customer is at the dealership system 103. The recommendation module 217 may provide a customized recommendation to the user device 109 of a customer responsive to the dealership system 215 notifying the management system 100 that the customer has checked in for service or to purchase products.

Alternatively, the recommendation module 217 or dealership system 103 may provide the customized recommendation to user devices 109 of customers while the customers are not located at the dealership system 103. The customized recommendations may entice the customer to then visit the dealership system 103 to take advantage of the customized recommendation of product and/or services offered to the customer.

The recommendation module 215 may generate customized recommendations for a customer of the dealership system 103 based at least in part on the customer category assigned to the customer by the categorization module 211. Generally, customers that are assigned a customer category indicative of a higher importance of the customer to the dealership system 103 receive "better" offers than customers assigned with the customer category of lower importance.

In one embodiment, offers are "better" based on monetary costs or finance terms. Monetary costs include cost of automobiles, cost of parts, cost of services, or finance terms (e.g., annual percentage rate APR). The recommendation module 215 may determine the monetary costs and/or finance terms for a customized recommendation based on guidelines (e.g., rules) provided by the dealership system 103 that describe the level of monetary costs and/or finance terms associated with each customer category in one embodiment. The guidelines may describe for each customized category a discount to apply to the MSRP of certain types of products (e.g., parts or accessories) sold by the dealership system 103 or a discount to apply to the MSRP of specific models of automobiles sold by the dealership system 103. The guidelines may also describe a discount to apply to a standard APR rate for each customer category. For example, a given customer assigned a customer category of "champion customer" may receive a higher discount off a manufacturer's suggested retail price (MSPR) (e.g., $5,000 off MSPR) and lower finance terms (e.g., a lower APR such as 0%) when purchasing an automobile from the dealership system 103 compared to another customer categorized as a "promising customer" assuming both customers have good credit scores (e.g., above 700). In this example, the "promising customer" may only receive $3,000 off MSRP and an APR of 1%.

Offers may also be "better" in terms of freebies (e.g., free products or services) received by the customers. Examples of freebies include car washes or service packages that may be offered to a customer when the customer purchases an automobile from the dealership system 103. For example, a customer categorized as a "loyal customer" may receive for free 3-years' worth of annual service for an automobile at the time of purchase of the automobile compared to a "promising customer" that may only receive for free 1-year's worth of annual service for an automobile at the time of purchase of the automobile.

The recommendation module 215 can also utilize other factors in combination with or instead of the customer's assigned customer category to determine customized recommendations for customers. In one embodiment, the recommendation module 215 considers social features to determine customized recommendations for customers. In one embodiment, a social feature describes features pertaining to a customer's social life. An example of a social feature is a significant event in a customer's life that would warrant the customer buying a product or service from the dealership system 103.

The recommendation module 215 may periodically (e.g., monthly) receive from a customer's social networking account via the third-party service system 105 indications of significant events that have occurred or are upcoming in the customer's life. In one embodiment, the significant events are posted by the customer on the social networking system, for example. The identification of a significant event in the customer's life may cause the recommendation module 215 to generate a customized recommendation for the customer based on the significant event.

An example of a significant event in a customer's life is the customer created a post on the social networking system indicating that the customer recently had a baby. Responsive to the recommendation module 215 identifying the event, the recommendation module 215 may identify a type of vehicle currently owned by the customer (e.g., a sedan) from the customer's profile or through the dealership system 103 and may generate a recommendation for the customer to purchase a different type of automobile to replace the automobile currently owned by the customer. In this example, the recommendation module 215 may generate a recommendation to upsize from the customer's currently owned sedan to a sports utility vehicle (SUV) due to the new addition to the family.

In one embodiment, the recommendation module 215 generates the customized recommendation based on features related to the customer stored in the customer's customer profile. For example, the recommendation module 215 may extract features from the customer's profile that are indicative of the customer's browsing patterns on a website associated with the dealership system 103. The website may be the website of the dealership system 103 or the website of the automobile maker whose automobiles are sold through the dealership system 103. The recommendation module 215 may identify that the customer has previously viewed a specific model automobile on the website of the dealership system 103 with particular attributes (e.g., color, options, etc.) configured by the customer on the website and may generate a customized recommendation for the model automobile with the attributes previously configured by the customer. Continuing the example above regarding the generation of a recommendation for the customer to upsize from the sedan to a SUV, the recommendation may indicate a specific model SUV with the attributes previously configured by the customer.

The recommendation module 215 may also consider the customer's previous spending patterns at the dealership system 103 and the income level of the of the customer when generating the customized recommendation. The recommendation module 215 may identify the amount spent when the customer most recently purchased an automobile from the dealership system 215 and customer's income level at that time. The recommendation module 215 may then determine a difference between the customer's current income level and the customer's prior income level. The determined difference may be indicative of a percentage of money that the customer may be willing to spend on a new vehicle that is more than the last purchase of the customer at the dealership system 103 in one embodiment. For example, if the customer is currently making 15% more than when the customer last purchased an automobile from the dealership system, the recommendation module 215 may generate a recommendation to purchase an automobile that costs 15% more than the last automobile purchased by the customer from the dealership system 103. Continuing the example above regarding the generation of a recommendation for the customer to upsize from the sedan to a specific SUV with attributes configured by the customer, the recommendation may have an offered price for the SUV that considers the customers current and past income level as well as prior spending patterns.

In one embodiment, the recommendation module 215 may also consider features of other customers of the dealership system 103 when generating a customized recommendation for a customer. The recommendation module 215 may identify other customers of the dealership system 103 that are "similar" to a given customer of the dealership system 103 and assume that the given customer will share the same preferences as the other customers due to the similarity between the given customer and the other customers. Similarity can be based on any of the customer feature information stored in the customer profile database 203 such as demographic information and/or spending information for example. Similarity may also be determined based on other features such as service history, year, make and model of automobiles, accessories sold for the same model automobiles, etc. Two customers can be considered "similar" if they share a threshold amount of features in the customer profiles that are common to both customers in one embodiment. In one embodiment, the recommendation module 215 may employ collaborative filtering techniques to make predictions about preferences of the given user based on preferences of the other users that are similar to the given user.

Continuing the example above regarding the generation of a recommendation for the customer to upsize from the sedan, the recommendation to upgrade to the SUV and the specific model SUV may be based on SUV's purchased by other customers of the dealership system 103 that are similar to the customer. The recommendation module 215 may identify that the other customers that recently had a baby, currently own a sedan, and share similar features (e.g., demographic and spending information) as the customer, purchased a particular model of SUV. Accordingly, the recommendation module 215 may assume that the customer would also have a preference for the particular model SUV purchased by the other users and thereby generate a customized recommendation to purchase the particular model SUV.

In one embodiment, the recommendation module 215 considers the current inventory of the dealership system 103 when generating a customized recommendation for the customer. By considering the current inventory of the dealership system 103 as determined by the inventory module 212, the recommendation module 215 only generates a recommendation including products that are currently in stock at the dealership system 103 in one embodiment.

Continuing the example above, the recommendation module 215 may only generate a recommendation for a model SUV with particular attributes (e.g., white color) if the dealership system 103 has an instance of the recommended SUV with the particular attributes currently in stock.

In one embodiment, the recommendation module 215 may still generate recommendations for products that are not currently in stock at the dealership system 103. However, the recommendation module 215 may provide a recommendation to the dealership system 103 to acquire additional inventory sufficient to fulfill the recommendations. Given that the customized recommendations are indicative of products that customers of the dealership system 103 are likely to purchase, the recommendations generated by the recommendation module 215 may cause the dealership system 103 to optimize their current inventory to align with the needs of their customers.

In another embodiment, the recommendation module 215 generates customized recommendations for customers based on ongoing or future incentives. The management system 100 may receive from the dealership system 103 current and future incentives that are stored in the incentive database 217. In one embodiment, incentives (e.g., promotions or deals) are special offers designed to entice customers to purchase an automobile from the dealership system 103. Incentives may currently be offered incentives or will be offered in the near future (e.g., within the next 3 months). An example of an incentive is a special APR rate (e.g., 0% APR) or a discount on particular model automobiles (e.g., $5,000 off MSRP). Thus, the customized recommendations generated by the recommendation module 215 may include any incentives currently offered by the dealership system 103 or that will be offered in the future.

In one embodiment, the incentives may be unique to a specific dealership system 103. That is, no other dealership system 103 may offer that same incentive. For example, if dealership system 103A and dealership system 103B both sell the same make automobiles, dealership system 103A may currently offer incentives (e.g., 1% financing) that are not being offered by dealership system 103B. Alternatively, the incentives may be specific to the automobile manufacturer that manufactures the automobiles sold by the dealership systems 103. Thus, all the dealership systems 103 that sell the automobiles built by the automobile manufacturer may have the same incentive. For example, GM may be offering special financing terms that will be offered by all of the dealership systems 103 that sell GM automobiles.

In one embodiment, the recommendation module 215 may also generate customized recommendations for customers of the dealership system 103 that have a lease on an automobile that is nearing expiration (e.g., within the next 2 months). The recommendation module 215 may have access to customer lease information through the dealership system 103 that allows the recommendation module 215 to determine leases that are nearing expiration from the customer lease information. Alternatively, the recommendation module 215 may receive indications of customers with leases nearing expiration from the dealership system 103.

Responsive to the recommendation module 215 determining that a customer's lease is nearing expiration, the recommendation module 215 may generate a recommendation for the customer to obtain a new lease where the recommendation includes customized lease terms and a vehicle recommendation that is specific to the customer. The lease terms at the very least match the current lease terms of the customer's current lease. However, the recommendation module 215 may provide lease terms in the recommendation that are an improvement on the current lease terms such as a lower money factor than the money factor of the current lease. The recommendation module 215 may consider any combination of the various factors described above when generating the customized lease terms and customized vehicle recommendation such as customer category, social features (e.g., significant events), browsing patterns of the customer, spending information, predictions based on preferences of other customers, current inventory of the dealership system 103, or incentives.

The recommendation module 215 may also generate customized recommendations for parts, accessories, and services to customers of the dealership system 103. The recommendation module 215 may employ a heuristic model when generating recommendations for parts, accessories, and services to customers of the dealership system 103. That is, the recommendation module 215 may implement a function that recognizes a type event that is going to occur in the near future for a customer (e.g., next 3 months) and uses the event as a heuristic to identify products, accessories, or accessories that are related to the event.

For example, the recommendation module 215 may identify that the customer is planning a road trip based on posts made by the customer on his or her social networking account. The recommendation module 215 may then recommend accessories to the customer that are related to the identified event. In one embodiment, the recommendation module 215 may recommend accessories to the customer based on the accessories purchased by other customers that experienced the same type of event. For example, the recommendation module 215 may predict that during a road trip, accessories such as new tires, tire chains, wiper blades, or fog lights are needed based on other customers also purchasing these accessories for a road trip. Thus, the recommendation module 215 may generate a customized recommendation including the customized accessories.

Continuing the road trip example, the recommendation module 215 may also recommend services to the customer that are related to the identified event of an upcoming road trip. Given the customer's car will be driven long distances during the road trip, the recommendation module 215 may generate a recommendation for a fluid inspection (e.g., oil inspection, coolant inspection, etc.) as well as a brake inspection (e.g., inspect brake pad wear and brake rotor thickness).

In one embodiment, the recommendation module 215 may also generate accessory recommendations based on environmental factors. For example, the recommendation module 215 may identify upcoming weather phenomena in the geographic location of customers of the dealership system 103. The weather phenomena may be identified by the recommendation module 215 from weather reports received from a third-party service system 105. Responsive to the identified weather phenomena, the recommendation module 215 may generate a recommendation to purchase accessories related to the weather phenomena. For example, if the weather phenomena is a rain storm, the recommendation module 215 may generate a recommendation for the customer to purchase wiper blades. In another example, if the weather phenomena is a snow storm, the recommendation module 215 may generate a recommendation for the customer to purchase snow chains or snow tires.

The above description described various factors when generating customized recommendations for customers of the dealership system 103 such as customer category, social features (e.g., significant events), browsing patterns of the customer, spending information, predictions based on preferences of other customers, current inventory of the dealership system 103, incentives, weather, etc. The different factors may be used solely or in various combinations with each other by the recommendation module 215 to generate customized recommendations for customers of the dealership system 215. As mentioned above, the management system 100 may provide the customized recommendations to the dealership system 103 such that the dealership system 103 provides the customized recommendations to its customers while the customers are on site at the dealership system 103. Alternatively, the recommendation module 215 may provide the customized recommendations directly to the customers of the dealership system 215 while the customers are at the dealership system 215 or located at locations other than the dealership system 215.

Dealership System

Figure 3:
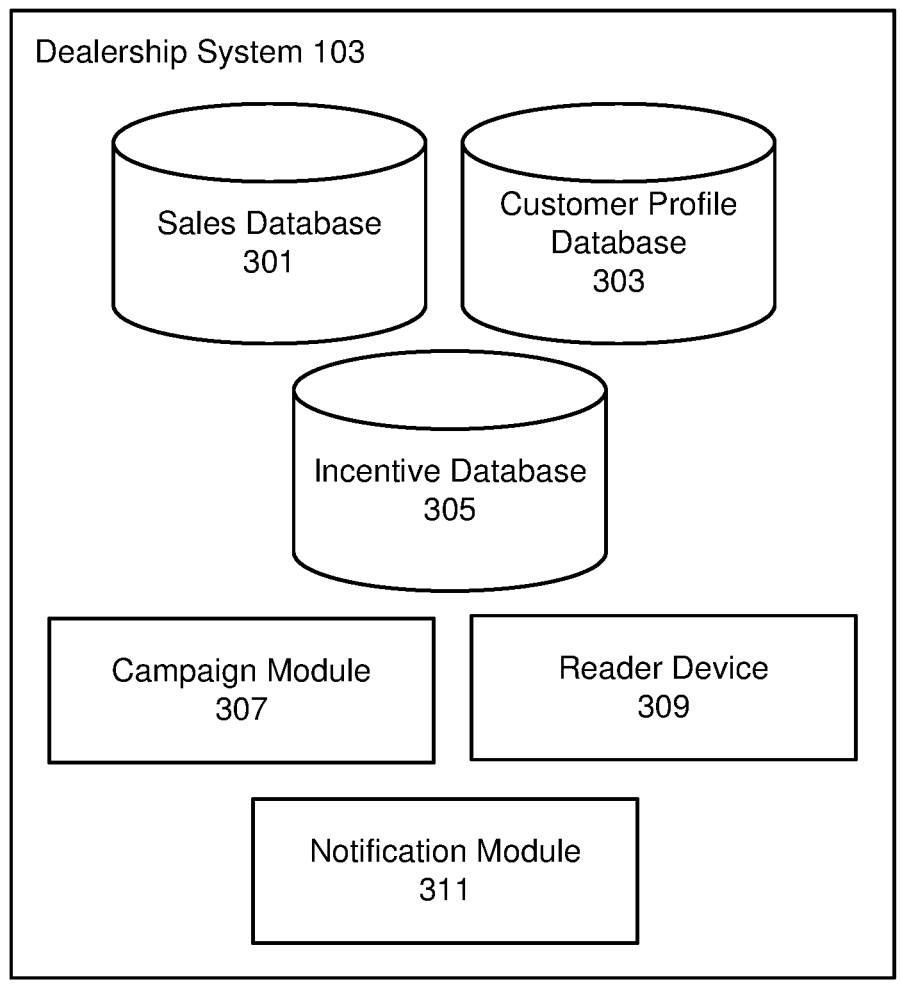
FIG. 3 is a high-level block diagram illustrating a detailed view of a dealership system of FIG. 1, according to one embodiment.

FIG. 3 is a high-level block diagram illustrating a detailed view of a dealership system 103 of FIG. 1, according to one embodiment. In one embodiment, the dealership system 103 includes a sales database 301, a customer profile database 303, an incentive database 305, a campaign module 307, a reader device 309, and a notification module 311. Note that in other embodiments, the dealership system 103 may store other databases and modules than those described herein.

The sales database 301 stores records of sales at the dealership system 103. The sales may be for automobiles, parts, accessories, and/or services offered by the dealership system 103. Each record in the sales database 301 includes an indication of the product that was sold (e.g., an automobile), the amount of the sale, the payment information (e.g., credit card information, wire transfer information, personal check, cash), customer information (e.g., customer name and contact information), and the employee(s) of the dealership system 103 that assisted in the sale.

In one embodiment, the customer profile database 303 stores customer profiles of the dealership system 103's customers. The customer profiles stored in the dealership system 103 include only information of the customers obtained by the dealership system 103. For example, the customer profiles stored in the dealership system 103 may include spending information based on the sales database 301 and demographic information obtained by the dealership system 103. However, the customer profiles stored in the dealership system 103 lack social information and driving information as described above with respect to the customer profiles stored in the management system 101.

The incentive database 305 stores current and future incentives of the dealership system 103. The incentive database 305 is similar to the incentive database 217 described above with respect to the management system 100. As mentioned above, incentives are special offers designed to entice customers to purchase an automobile from the dealership system 103. Incentives may currently be offered or will be offered in the near future (e.g., within the next 3 months). Incentives may be unique to a specific dealership system 103 or incentives may be specific to the automobile manufacturer that manufactures the automobiles sold by the dealership systems 103.

In one embodiment, the campaign module 307 generates customized marketing campaigns for customers of the dealership system 103. Generally, a campaign is an example of marketing used by the dealership system 103 to raise awareness of the dealership system 103 to its customers. The campaign may include customized recommendations generated by the management system 101 as described above or customized recommendations generated by the dealership system 103.

In one embodiment, the customized marketing campaigns are based on customer preferences identified by the management system 101. For example, the campaign module 307 may receive preferences for each of the dealership system 103's customers from the management system 101. The preferences may include the types of media that the customer is most receptive to. The different types of media include print media, digital media, social media, e-mail, telephone, etc. Accordingly, the campaign module 307 may generate marketing campaigns for each customer that is in the preferred media type of the customer.

In one embodiment, the campaign module 307 may customize the campaigns for each customer based on the customer category assigned to the customer by the management system 101. The campaign module 307 may receive the customer category assigned to each of the dealership system 10's customers from the management system 101. The campaign module 307 may then customize the timing of when campaigns are sent to customers as well as the frequency in which the campaigns are sent to the customers.

For example, customers assigned categories indicative that the customers may be losing interest in the dealership system 103 (e.g., customer needing attention, customer about to sleep, at risk customer, a prior champion customer, and a lost customer) may be contacted immediately by the campaign module 307 in accordance with the customer's preferred media type. In contrast, customers that are assigned categories indicative of a healthy relationship with the dealership system 103 (e.g., champion customer, loyal customer, potential loyal customer, recent customer, and promising customer) may not require immediate attention. That is, the campaign module 307 may not need to immediately transmit customized campaigns to customers with a healthy relationship with the dealership system 103. However, the campaign module 307 may offer promotions or deals to customers categorized as champion customer, loyal customer, potential loyal customer, recent customer, or promising customer that is in accordance with the category assigned to the customer to reward these customers for being loyal to the dealership system 103.

In one embodiment, the dealership system 103 includes a reader device 309. An example of a reader device 309 is a radio-frequency identification (RFID) reader. While FIG. 3 illustrates only a single reader device 309, the dealership system 103 can have any number of reader devices 309.

Automobiles of customers of a dealership system 109 may have machine-readable tags (e.g., a RFID tag) placed on the automobiles such as on the dashboards or windshields of the automobiles, for example. A machine-readable tag may be placed on an automobile at the time of purchase of the automobile from the dealership system 103. Alternatively, a machine-readable tag may be placed on an automobile when the automobile is first serviced by the dealership system 103.

The machine-readable tag may include owner information about the owner of the automobile as well as information about the automobile associated with the machine-readable tag. For example, the owner information includes at least the name of the owner of the vehicle, but may include any other information about the owner stored in the customer profile for the owner. The information about the automobile may include the year of manufacture of the automobile, make of the automobile, model of the automobile, and VIN of the automobile.

In one embodiment, the reader device 309 is mounted at particular locations of the dealership system 103 such as in the service lane area of the dealership system 103. The service lane area includes designated areas where customers park their automobiles for service at the dealership system 103. Responsive to an automobile being parked in the service lane area, the reader device 309 may automatically scan (e.g., reads) the machine-readable tag on the automobile to extract the owner information and automobile information from the machine-readable tag mounted on the automobile.

In one embodiment, the notification module 311 generates notifications responsive to the reader device 309 extracting information from machine-readable tags. The notification module 311 may generate a customized notification welcoming the customer to the dealership system 103 and cause the dealership device 107 (e.g., a display monitor mounted in the service area) to display the customized notification. In one embodiment, the customized notification may include a greeting with the customer's name and an indication of the service advisor that will be working with the customer to service the automobile.

In one embodiment, the notification module 311 may automatically generate an arrival notification that the customer has arrived and transmits the arrival notification to a dealership device 107 of the service advisor (e.g., a mobile phone) that is responsible for assisting the customer. The notification sent to the service advisor alerts the service advisor of the arrival of the customer. In one embodiment, the notification may include the owner information and automobile information extracted from the machine-readable tag. In one embodiment, the notification sent to the service advisor may also include an indication of the customer category assigned to the customer as well as any customized recommendations generated for the customer. By receiving a notification of the customer category assigned to the customer that the service advisor is responsible for, the service advisor may modify his or her behavior when dealing with the customer. For example, the service advisor may be more attentive than usual if the customer is a "champion" customer for example. Further details of the customer check-in process are described at U.S. patent application Ser. No. 15/721,569 filed on Sep. 29, 2017, which is incorporated by reference in its entirety.

Process for Providing Recommendations and Campaigns

Figure 4:
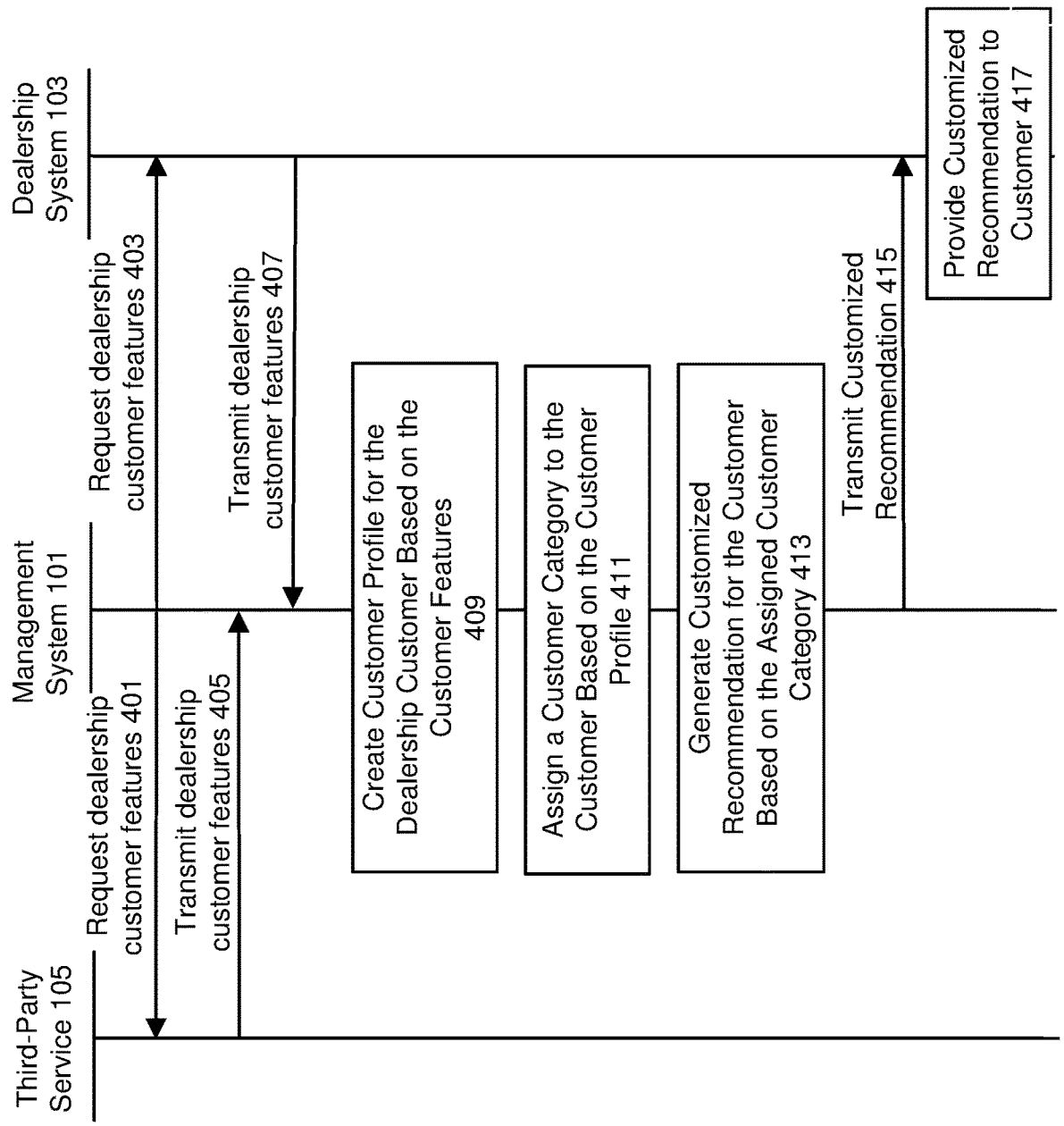
FIG. 4 is an interaction diagram illustrating a process of providing customized recommendations according to one embodiment.

FIG. 4 is an interaction diagram illustrating a process of providing customized recommendations according to one embodiment. In one embodiment, the management system 101 transmits 401 a request for features of a customer of the dealership system 103 to one or more third-party services 105. The features requested from the third-party service 105 may be social information and driving information, for example. Responsive to the request, the third party service(s) 105 transmits 405 the requested features of the customer to the management system 101.

The management system 101 also transmits 403 a request for features of the customer to the dealership system 103. The features requested from the dealership system 103 include demographic information and spending information. Responsive to the request, the dealership system 103 transmits 407 the requested features of the customer to the management system 101.

The management system 101 creates 409 a customer profile for the customer of the dealership system 103 based on the received features from the third-party service 105 and the dealership system 103. The management system 101 may assign 411 a customer category to the customer based on the customer profile 411. The customer category may describe a level of importance of the customer to the dealership system 103. In one embodiment, the customer category is assigned to a customer based on monetary features such as total amount of money spent at the dealership system 103, a frequency of purchases made at the dealership system 103, and a recency of a last purchase made at the dealership system 103.

The management system 101 then generates 413 a customized recommendation of products and/or services for the customer based on the assigned category. Generally, customized recommendations for customers that are assigned a customer category indicative of a higher importance of the customer to the dealership system 103 have "better" offers than recommendations for customers assigned with the customer category of lower importance. In one embodiment, the customized recommendation created by the management system 101 may also be created based on factors other than just the assigned customer category such as social features (e.g., significant events), browsing patterns of the customer, spending information, predictions based on preferences of other customers, current inventory of the dealership system 103, incentives, weather, etc.

In one embodiment, the management system 101 transmits 415 the customized recommendation for the customer to the dealership system 103. The dealership system 103 may then provide 417 the customized recommendation to the customer. In one embodiment, the dealership system 103 may provide the customized recommendation while the customer is on-site at the dealership system 103. For example, the dealership system 103 may provide the customized recommendation to the customer when the customer checks-in with a service advisor for service of his or her automobile at the dealership system 103. Alternatively, the dealership system 103 may provide the customized recommendation to the customer when the customer arrives at the dealership system 103 to browse the dealership system 103's current automobile inventory. It is beneficial to provide the customized recommendations to customers in real-time as customers are more inclined to purchase products and/or services while already at the dealership system 103.

Figure 5:
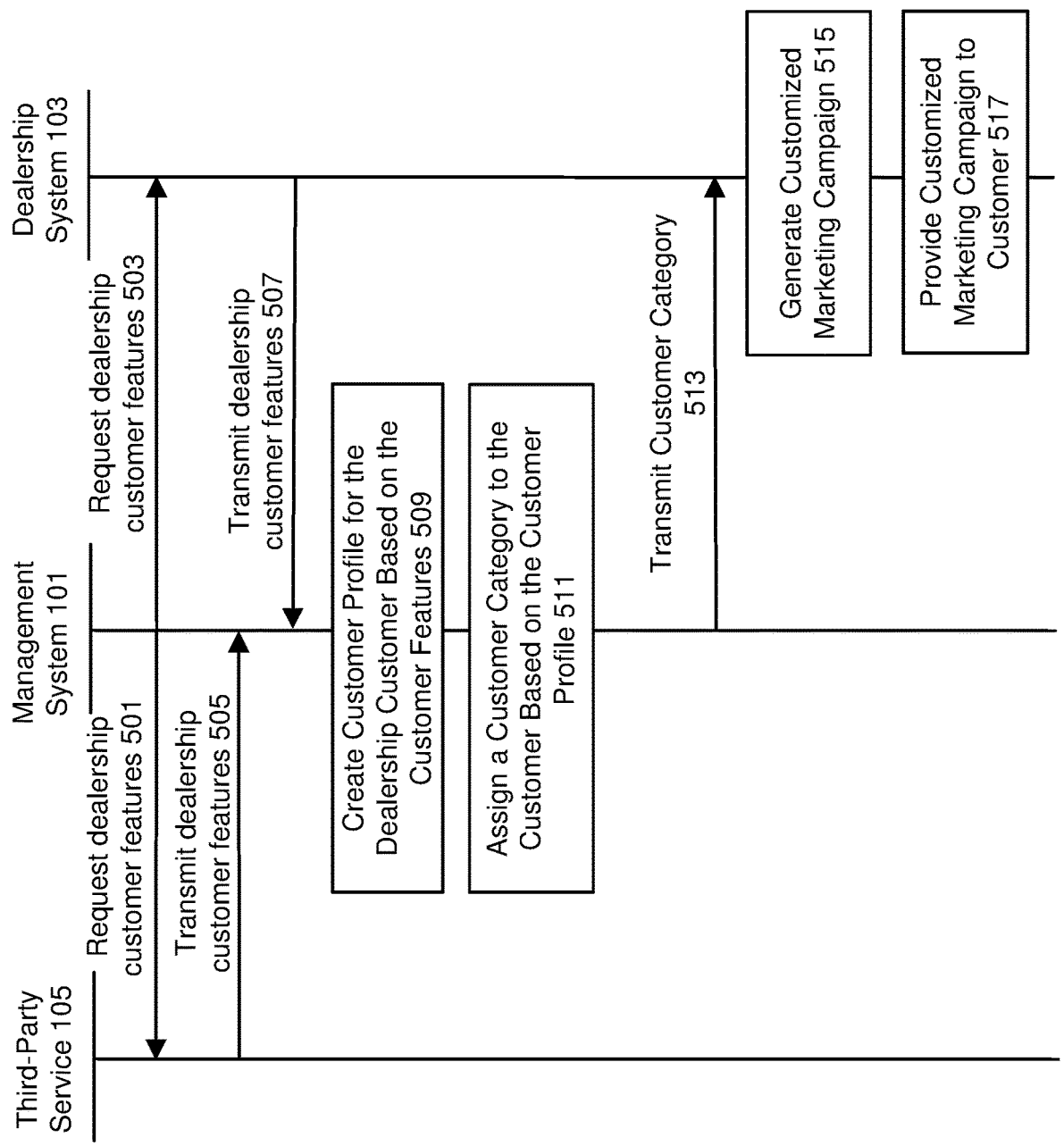
FIG. 5 is an interaction diagram illustrating a process of providing customized campaigns according to one embodiment.

FIG. 5 is an interaction diagram illustrating a process of providing a customized marketing campaign according to one embodiment. In one embodiment, the management system 101 transmits 501 a request for features of a customer of the dealership system 103 to one or more third-party services 105. The features requested from the third-party service 105 may be social information and driving information, for example. Responsive to the request, the third party service(s) 105 transmits 505 the requested features of the customer to the management system 101.

The management system 101 also transmits 503 a request for features of the customer to the dealership system 103. The features requested from the dealership system 103 include demographic information and spending information. Responsive to the request, the dealership system 103 transmits 507 the requested features of the customer to the management system 101.

The management system 101 creates 509 a customer profile for the customer of the dealership system 103 based on the received features from the third-party service 105 and the dealership system 103. The management system 101 may assign 511 a customer category to the customer based on the customer profile 411. As mentioned above, the customer category may describe a level of importance of the customer to the dealership system 103. In one embodiment, the customer category is assigned to a customer based on monetary associated features such as total amount of money spent at the dealership system 103, a frequency of purchases made at the dealership system 103, and a recency of a last purchase made at the dealership system 103.

The management system 101 transmits 513 the customer category assigned to the customer to the dealership system 103. The dealership system 103 may generate 515 a customized marketing campaign based at least in part on the customer category. For example, the dealership system 103 may customize the offers included in the customized marketing campaign as well as the urgency in which to contact the customer based on the customer category. In one embodiment, the dealership system 103 may generate 515 the customized marketing campaign in a media type preferred by the customer. The dealership system 103 then provides 517 the customized marketing campaign to the customer.

Hardware Components

Figure 6:
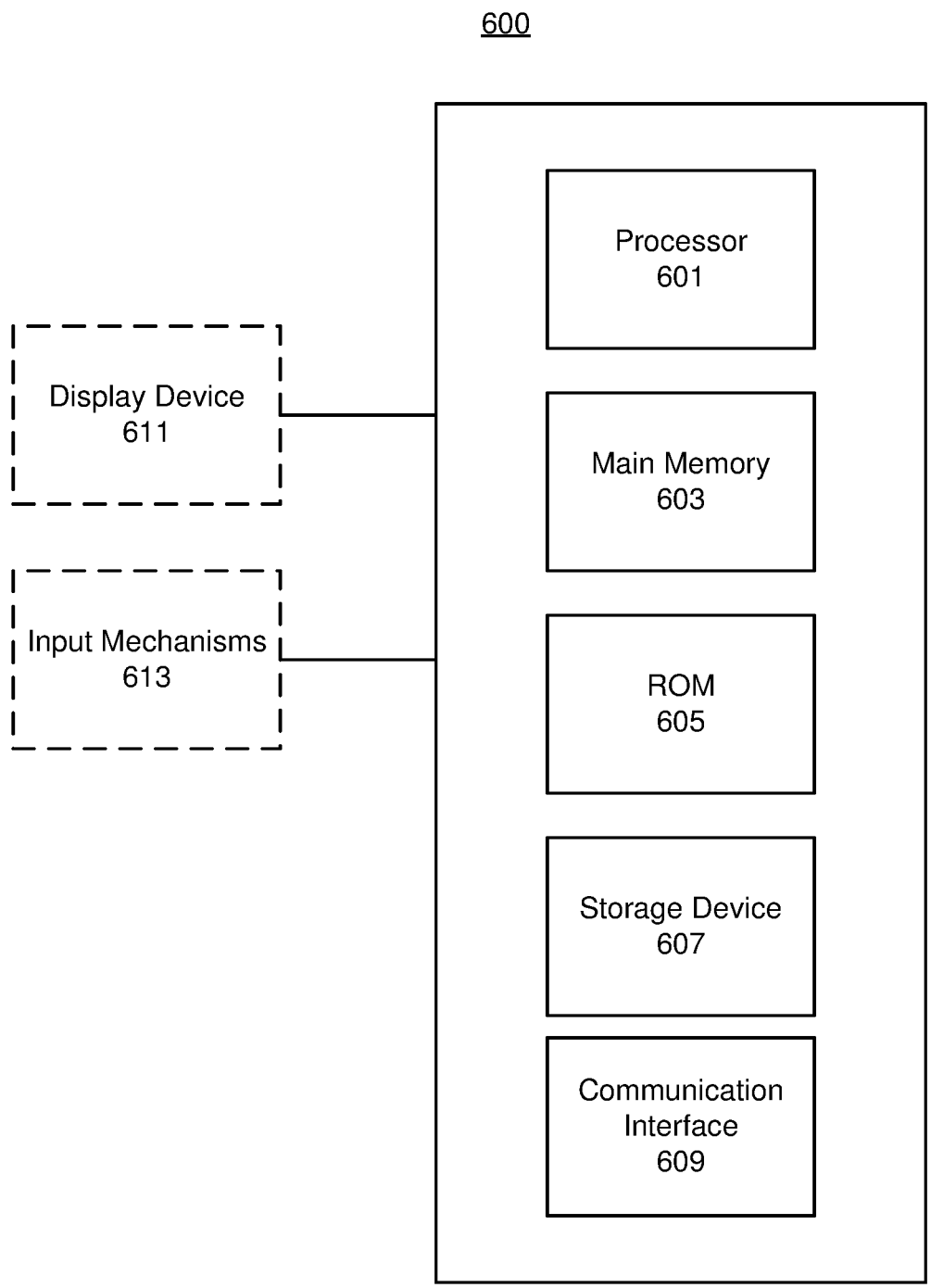
FIG. 6 is system diagram of a computer system, according to one embodiment.

FIG. 6 is a diagram illustrating a computer system 600 upon which embodiments described herein may be implemented within the management system 101, dealership system 103, third-party service system 105, dealership device 107, and user device 109. For example, in the context of FIG. 1, the management system 100, dealership system 103, third-party service system 105, dealership device 107, and user device 109 may each be implemented using a computer system such as described by FIG. 6. The management module 101 and/or dealership system 103 may also be implemented using a combination of multiple computer systems as described by FIG. 6.

In one implementation, the management system 100, dealership system 103, third-party service system 105, dealership device 107, and user device 109 each include processing resources 601, main memory 603, read only memory (ROM) 605, storage device 607, and a communication interface 609. The management system 100, dealership system 103, third-party service system 104, dealership device 107, and user device 109 includes at least one processor 601 for processing information and a main memory 603, such as a random access memory (RAM) or other dynamic storage device, for storing information and instructions to be executed by the processor 801. In one embodiment, multiple processors are employed by the management system 100 to perform the techniques described above in order to improve efficiency of the management system 100 and reduce computation time when generating the customized recommendations. Main memory 603 also may be used for storing temporary variables or other intermediate information during execution of instructions to be executed by processor 601. Management system 100, dealership system 103, third-party service system 104, dealership device 107, and user device 109 may each also include ROM 605 or other static storage device for storing static information and instructions for processor 601. The storage device 607, such as a magnetic disk or optical disk or solid state memory device, is provided for storing information and instructions.

The communication interface 609 can enable each of the management system 100, dealership system 103, third-party service system 104, dealership device 107, and user device 109 to communicate with each other through use of a communication link (wireless or wireline). Each of the management system 100, dealership system 103, third-party service system 104, dealership device 107, and user device 109 can optionally include a display device 611, such as a cathode ray tube (CRT), an LCD monitor, an LED monitor, OLED monitor, a TFT display or a television set, for example, for displaying graphics and information to a user. An input mechanism 613, such as a keyboard that includes alphanumeric keys and other keys, can optionally be coupled to the computer system 600 for communicating information and command selections to processor 601. Other non-limiting, illustrative examples of input mechanisms 613 include a mouse, a trackball, touch-sensitive screen, or cursor direction keys for communicating direction information and command selections to processor 601 and for controlling cursor movement on display device 611.

Examples described herein are related to the use of the management system 100, dealership system 103, third-party service system 104, dealership device 107, and user device 109 for implementing the techniques described herein. According to one embodiment, those techniques are performed by each of the management system 100, dealership system 103, third-party service system 104, dealership device 107, and user device 109 in response to processor 601 executing one or more sequences of one or more instructions contained in main memory 603. Such instructions may be read into main memory 603 from another machine-readable medium, such as storage device 607. Execution of the sequences of instructions contained in main memory 603 causes processor 601 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method of a management system for providing customized recommendations of products and services for customers of an automobile dealership, the computer-implemented method comprising:

accessing, by the management system, a plurality of sets of training customer profiles, each set of training customer profiles associated with a corresponding customer category from a plurality of customer categories of the automobile dealership and includes a plurality of training customer profiles that are assigned to the corresponding customer category, each customer category from the plurality of customer categories associated with a different level of importance to the automobile dealership;

extracting, for each set of training customer profiles from the plurality of sets of training customer profiles, features from the plurality of training customer profiles included in the set that are representative of the customer category corresponding to the set, the extracted features from each of the plurality of training customer profiles including a total amount of money spent at the automobile dealership, a frequency of purchases made at the automobile dealership, and a recency of a last purchase made at the automobile dealership;

training, by the management system, a categorization module of the management system to learn features associated with each of the plurality of customer categories using the extracted features from the plurality of training customer profiles included in the plurality of sets of training customer profiles, wherein the categorization module is a machine learned recency, frequency, and monetary analysis (RFMA) model;

storing a customer profile of a customer of the automobile dealership, the customer profile describing features of the customer including the customer's spending information at the automobile dealership, the spending information including a total amount of money spent by the customer at the automobile dealership, a frequency of purchases made by the customer at the automobile dealership, and a recency of a last purchase made by the customer at the automobile dealership;

applying, by the management system, the spending information of the customer to the trained categorization module of the management system to assign a customer category from the plurality of customer categories to the customer, the assigned customer category indicative of a level of importance of the customer to the automobile dealership; and providing the assigned customer category to the automobile dealership;

wherein a customized recommendation of at least one of a product or service for the customer to purchase from the automobile dealership is provided to the customer while the customer is at the automobile dealership, the customized recommendation of the at least one of the product or the service based on the assigned customer category.

2. The computer-implemented method of claim 1, wherein the customized recommendation is provided to the customer via a device of the automobile dealership while the customer checks-in with a service advisor responsible for servicing the customer's automobile or via the device of the automobile dealership while the customer checks-in with a sales associate responsible for assisting the customer to purchase an automobile from the automobile dealership.

3. The computer-implemented method of claim 1, wherein the spending information of the customer further describes a history of transactions of automobiles, parts, accessories, and services purchased by the customer from the automobile dealership, each transaction including an amount spent at the automobile dealership and a date of the transaction.

4. The computer-implemented method of claim 1, further comprising:
retrieving features of the customer for the customer profile from a plurality of sources including the automobile dealership, one or more social networking systems each having a social networking account for the customer, and a vehicle data company,
wherein the features retrieved from the automobile dealership include demographic information of the customer including income level, the spending information of the customer at the automobile dealership, automobile ownership history of the customer, and browsing history of the customer of a website associated with the automobile dealership,
wherein the features retrieved from the one or more social networking systems include social information describing at least one of events that have occurred in the customer's life as posted by the customer in the one or more social networking systems or upcoming events that have yet to occur in the customer's life as posted by the customer in the one or more social networking systems, and
wherein the features retrieved from the vehicle data company include driving information of the customer describing the customer's automobile accident history and a last known mileage of one or more automobiles owned by the customer.

5. The computer-implemented method of claim 4, wherein the product is an automobile and the method further comprising:
generating the customized recommendation of the automobile for the customer based on the assigned customer category, the customized recommendation including at least one of an offered discount from a manufacturer's suggested retail price (MSRP) of the automobile or discounted financing terms for financing the automobile, the offered discount and the discounted financing terms based on the customer category assigned to the customer.

6. The computer-implemented method of claim 5, wherein another customer that is assigned a customer category indicative that the other customer has a level of importance to the automobile dealership that is less than the customer receives a customized recommendation for the same automobile that includes at least one of an offered discount from the MSRP of the automobile that is less than the offered discount or discounted financing terms that are more than the discounted financing terms offered to the customer.

7. The computer-implemented method of claim 5, wherein generating the customized recommendation of the automobile comprises:
identifying a type of an automobile currently owned by the customer;
identifying an event from the one or more events included in the retrieved social information of the customer that warrants the customer replacing the automobile currently owned by the customer; and
determining a type of automobile to include in the recommendation based on the identified event.

8. The computer-implemented method of claim 7, further comprising:
determining a model of the automobile that is of the determined type to recommend to the customer based on the browsing history of the customer of the website associated with the automobile dealership.

9. The computer-implemented method of claim 8, wherein determining the model of the automobile comprises:
determining attributes of the model of the automobile based on a customer configuration of the model of the automobile on the website, the attributes including a color of the automobile and options for the automobile.

10. The computer-implemented method of claim 8, further comprising:
determining that the automobile currently owned by the customer is a lease that expires in a threshold amount of time;
generating lease terms for the determined model of the automobile to include in the customized recommendation based on the lease terms of the lease.

11. The computer-implemented method of claim 7, further comprising:
determining a model of the automobile that is of the determined type to recommend to the customer based on the income level of the customer and the spending information of the customer at the automobile dealership.

12. The computer-implemented method of claim 5, wherein generating the customized recommendation of the automobile comprises:
identifying a plurality of other customers of the automobile dealership having customer profiles including features that match features included in the customer profile of the customer; and determining a model of the automobile to include in the customized recommendation based on automobiles purchased by the plurality of other customers.

13. The computer-implemented method of claim 5, wherein generating the customized recommendation of the automobile comprises:

determining a current inventory of automobiles at the automobile dealership; and determining a model of automobile to include in the recommendation based on the current inventory of the automobiles at the automobile dealership.

14. The computer-implemented method of claim 13, further comprising:

responsive to the model not being in the current inventory, providing a recommendation to the automobile dealership to revise the current inventory of automobiles based on the determined model of automobile to include in the recommendation.

15. The computer-implemented method of claim 5, wherein the customized recommendation is generated by the management system and provided to the automobile dealership to provide to the customer.

16. The computer-implemented method of claim 5, wherein the customized recommendation is generated by the automobile dealership.

17. The computer-implemented method of claim 4, wherein the product is an automobile and the method further comprising:

generating the customized recommendation of the automobile for the customer based on incentives offered by one of the automobile dealership or an automotive manufacturer that manufactures automobiles sold by the automobile dealership.

18. The computer-implemented method of claim 4, the method further comprising:

identifying an automobile currently owned by the customer;

identifying an upcoming event from the one or more events included in the retrieved social information of the customer; and determining a type of service to perform on the automobile at the automobile dealership based on the upcoming event, the determined type of service included in the customized recommendation.

19. The computer-implemented method of claim 4, the method further comprising:

identifying an automobile currently owned by the customer;

identifying an upcoming event from the one or more events included in the retrieved social information of the customer; and determining an accessory for the automobile to recommend for purchase at the automobile dealership based on the upcoming event, the determined accessory included in the customized recommendation.

20. The computer-implemented method of claim 1, wherein the automobile dealership generates customized marketing for the customer based on the assigned customer category and a media preference type of the customer.

21. A non-transitory computer-readable storage medium storing executable computer program instructions of a management system for providing customized recommendations of products and services for customers of an automobile dealership, the instructions when executed by one or more computer processors cause the one or more computer processors to perform steps comprising:

accessing, by the management system, a plurality of sets of training customer profiles, each set of training customer profiles associated with a corresponding customer category from a plurality of customer categories of the automobile dealership and includes a plurality of training customer profiles that are assigned to the corresponding customer category, each customer category from the plurality of customer categories associated with a different level of importance to the automobile dealership;

extracting, for each set of training customer profiles from the plurality of sets of training customer profiles, features from the plurality of training customer profiles included in the set that are representative of the customer category corresponding to the set, the extracted features from each of the plurality of training customer profiles including a total amount of money spent at the automobile dealership, a frequency of purchases made at the automobile dealership, and a recency of a last purchase made at the automobile dealership;

training, by the management system, a categorization module of the management system to learn features associated with each of the plurality of customer categories using the extracted features from the plurality of training customer profiles included in the plurality of sets of training customer profiles, wherein the categorization module is a machine learned recency, frequency, and monetary analysis (RFMA) model;

storing a customer profile of a customer of the automobile dealership, the customer profile describing features of the customer including the customer's spending information at the automobile dealership, the spending information including a total amount of money spent by the customer at the automobile dealership, a frequency of purchases made by the customer at the automobile dealership, and a recency of a last purchase made by the customer at the automobile dealership;

applying, by the management system, the spending information of the customer to the trained categorization module of the management system to assign a customer category from the plurality of customer categories to the customer, the assigned customer category indicative of a level of importance of the customer to the automobile dealership; and providing the assigned customer category to the automobile dealership;

wherein a customized recommendation of at least one of a product or service for the customer to purchase from the automobile dealership is provided to the customer while the customer is at the automobile dealership, the customized recommendation of the at least one of the product or the service based on the assigned customer category.

22. A management system for providing customized recommendations of products and services for customers of an automobile dealership, comprising: one or more computer processors; and a non-transitory computer-readable storage medium storing executable computer program instructions, the instructions when executed by the one or more computer processors cause the one or more computer processors to perform steps comprising:

accessing, by the management system, a plurality of sets of training customer profiles, each set of training customer profiles associated with a corresponding customer category from a plurality of customer categories of the automobile dealership and includes a plurality of training customer profiles that are assigned to the corresponding customer category, each customer category from the plurality of customer categories associated with a different level of importance to the automobile dealership;

extracting, for each set of training customer profiles from the plurality of sets of training customer profiles, features from the plurality of training customer profiles included in the set that are representative of the customer category corresponding to the set, the extracted features from each of the plurality of training customer profiles including a total amount of money spent at the automobile dealership, a frequency of purchases made at the automobile dealership, and a recency of a last purchase made at the automobile dealership;

training, by the management system, a categorization module of the management system to learn features associated with each of the plurality of customer categories using the extracted features from the plurality of training customer profiles included in the plurality of sets of training customer profiles, wherein the categorization module is a machine learned recency, frequency, and monetary analysis (RFMA) model;

storing a customer profile of a customer of the automobile dealership, the customer profile describing features of the customer including the customer's spending information at the automobile dealership, the spending information including a total amount of money spent by the customer at the automobile dealership, a frequency of purchases made by the customer at the automobile dealership, and a recency of a last purchase made by the customer at the automobile dealership;

applying, by the management system, the spending information of the customer to the trained categorization module of the management system to assign the customer category from a plurality of customer categories to the customer, the assigned customer category indicative of a level of importance of the customer to the automobile dealership; and providing the assigned customer category to the automobile dealership;

wherein a customized recommendation of at least one of a product or service for the customer to purchase from the automobile dealership is provided to the customer while the customer is at the automobile dealership, the customized recommendation of the at least one of the product or the service based on the assigned customer category.

* * * * *